T. I. DUFFY.
REAR AXLE FOR MOTOR VEHICLES.
APPLICATION FILED OCT. 28, 1912.
1,104,174.
Patented July 21, 1914.
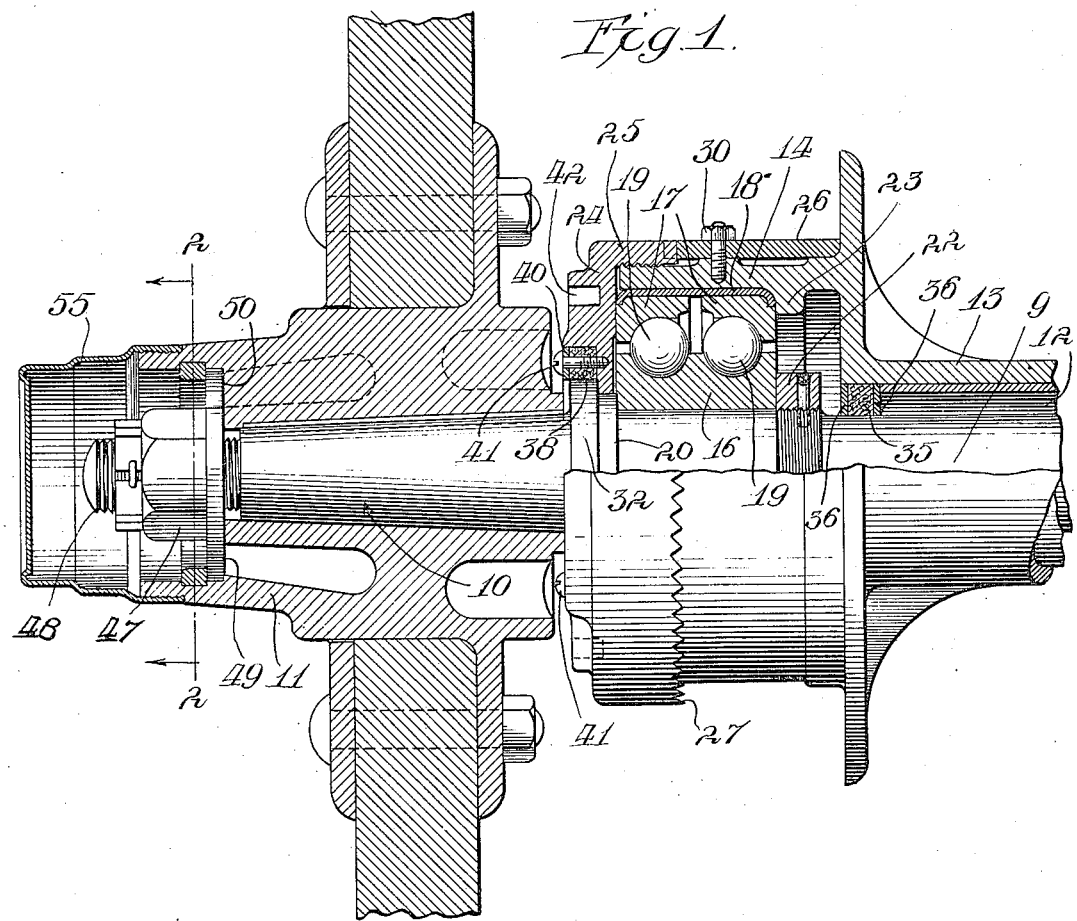
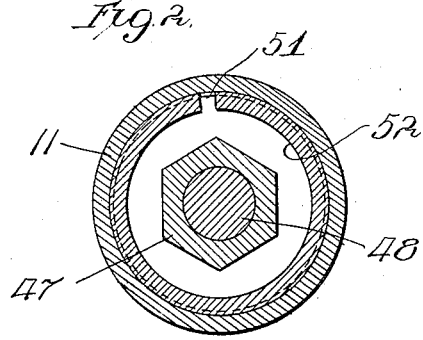
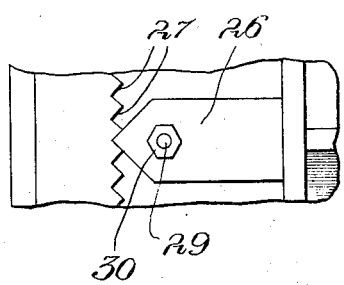
Witnesses:
Inventor:
Thomas I. Duffy.
By William L. Hall
Attys

UNITED STATES PATENT OFFICE.

THOMAS I. DUFFY, OF CHICAGO, ILLINOIS, ASSIGNOR TO E. C. SALES CO., OF CHICAGO, ILLINOIS, A CORPORATION OF ILLINOIS.

REAR AXLE FOR MOTOR-VEHICLES.

1,104,174.   Specification of Letters Patent.   Patented July 21, 1914.

Application filed October 28, 1912. Serial No. 728,215.

*To all whom it may concern:*

Be it known that I, THOMAS I. DUFFY, a citizen of the United States, and a resident of Chicago, in the county of Cook and State of Illinois, have invented certain new and useful Improvements in Rear Axles for Motor-Vehicles; and I do hereby declare that the following is a full, clear, and exact description thereof, reference being had to the accompanying drawings, and to the characters of reference marked thereon, which form a part of this specification.

This invention relates to improvements in rear or driving axles for motor vehicles, and refers more specifically to a hub and bearing construction by which the wheel hubs and the bearings therefor are carried by the axle.

My improvements refer more specifically to a rear or driving axle for motor vehicles of that type known as "semi-floating" axles, wherein the live axle or the member which drives the wheel also carries the weight of the load.

Among the objects of the invention is to provide an improved bearing between the axle casing or housing and the live or driving shaft of the axle, arranged to permit the removal of the bearings with the driving shaft.

A further object of the invention is to provide a novel construction for forcibly withdrawing the live axle from its tubular casing.

The invention consists in the matters hereinafter set forth and more particularly pointed out in the appended claims.

In the drawings:—Figure 1 is a partial elevation and partial section of a rear axle and hub mounting embodying my invention. Fig. 2 is a cross section on the line 2—2 of Fig. 1. Fig. 3 is a plan detail of a locking device for one of the bearing retaining rings of the axle bearing.

The axle is a semi-floating type, it comprising a drive shaft 9 upon the tapered spindle 10 of which the hub 11 of the wheel is mounted, a tubular member 12 surrounding and made larger than the shaft, and a cast metal housing 13 in which said tubular member fits. The housing 13 terminates in an enlarged, outwardly opening shell 14 which incloses a chamber which contains the anti-friction bearings between the axle housing and the driving shaft. The anti-friction bearings herein shown comprise an inner ring 16 fitted to the axle just inside its spindle portion and provided with twin ball races, two outer ball race members 17, 17 that are held together by the confining ring or band 18, and a series of interposed anti-friction balls 19 seated in the races. The inner bearing ring 16 is confined on the shaft between an integral annular shoulder 20 on the shaft at the base of the spindle and an annular nut or ring 22 that is screw-threaded to the shaft, and locked thereon in any suitable manner. The outer bearing members 17 are confined between an integral shoulder 23 of the shell 14 and a radial flange 24 of a ring 25 that fits over the open end of the shell and is internally screw-threaded to engage external screw-threads on said shell; the flange 24 constituting the front end wall of the shell. The said ring 25 is herein shown as locked in place by means of a pointed locking plate 26 applied to the exterior of the shell, with the pointed end thereof adapted to engage one of a series of notches 27 formed on the inner or rear edge of said ring. The locking plate may be attached to the bearing shell by means of a screw stud 29 which is screwed into the shell to extend through an opening in the lock plate, and is provided at its outer end with a screw-threaded lock nut 30 to clamp the plate on said shell. When the lock plate or member is removed, the ring 25 is free to be unscrewed from the shell.

The shaft 9 is provided exterior to the annular shoulder 22 with a larger annular flange 32. The radial flange 24 of the ring 25 fits at its inner margin upon the periphery of the smaller shoulder or flange 20, and behind the larger shoulder or flange 32. With this construction, when the ring 25 is turned off the bearing shell 14, the interlocking engagement of the inner margin of the flange 24 with the flange or shoulder 32 of the shaft has the effect to pull the shaft endwise out of the axle housing. The anti-friction bearings, being confined between the shoulder 20 and the ring 22, are also moved outwardly from the shell with the shaft so that the bearing, as a unit, is retained on the shaft when the axle is disassembled, thus avoiding the dismemberment of the bearings.

35 designates an oil retaining ring which surrounds the shaft 9 just in rear of said bearings, said ring being made of felt or like suitable fabric, and confined between the rings 36, 36. The oil retaining ring, as a whole, is pressed tightly in the housing and is held from moving inwardly by engagement with the outer end of the tube 12. The said oil retaining ring, as well as the annular bearing members which are mounted on the shaft are fitted in place over the inner end of the shaft. An oil retaining and dust ring 38 is applied to the radial flange 24 of the ring 25 to fit closely upon the periphery of the flange 32 of the shaft, and is confined between the bottom of an annular recess of said flange 24 and a thin ring 40 that is held in place by screws 41. The said ring 25 may be turned into and out of place by a spanner wrench or like instrument engaging suitable openings 42 in oppositely disposed thickened portions of the ring.
The hub 11 is non-rotatively mounted on the spindle portion 10 of the shaft, as by means of a key or spline 46 which engages grooved portions of the spindle hub, whereby the hub may be readily removed from the spindle. Said hub is locked on the spindle by means of a nut 47 which is screw-threaded over the reduced screw-threaded end 48 of the spindle. The nut is provided with a wide flange 49 to engage an outwardly facing shoulder 50 in the outer open end of the hub.

The wall of the outer open end of the hub is provided exterior to the flange 49 of the nut 47 with an internal shallow, annular groove 51, to receive a spring split ring 52, between which and the shoulder 50 the flange of said holding nut is confined from axial movement, but is free to turn or rotate. Therefore, when the nut is turned onto the screw-threaded end of the spindle the hub is forced upon the tapered spindle, and when the said nut is turned off the spindle the flanged portion of the nut serves to withdraw the hub from the spindle. Said nut may be locked on the spindle in any approved manner and is protected by the usual or any preferred form of hub cap 55.

I claim as my invention:—

1. In a semi-floating driving axle, a housing, a driving shaft rotatively mounted therein and axially removable therefrom, anti-friction bearings between the shaft and the housing embracing inner and outer raceway members and interposed anti-friction elements, with means for confining them on said shaft and for holding the bearing members assembled, whereby the bearings, as a unit, are removable with the axle and means screw-threaded to the housing and interlocked to the shaft to effect endwise removal thereof from the housing.

2. A driving axle and a wheel mounting for motor driven vehicles comprising, in combination with an axle body or housing, a rotative driving shaft mounted in and axially removable from said housing and provided with a spindle to receive a wheel hub, anti-friction bearings between said shaft and housing, means to confine the anti-friction bearings on the shaft and screw-threaded means engaging the housing and interlocked to the shaft to remove the shaft and the anti-friction bearings endwise away from said housing.

3. A driving axle and a wheel mounting for motor driven vehicles comprising, in combination with an axle body or housing, a rotative driving shaft mounted in and removable axially from the housing and provided beyond said housing with a spindle to receive a wheel hub, anti-friction bearings between said shaft and housing, inner and outer shoulders on the shaft between which the anti-friction bearings are confined, with means to hold the bearing members assembled on the shaft in all positions of said shaft, and a ring screw-threaded to the housing and provided with a flange to close the outer end thereof and to interlock with said shaft, whereby, when the ring is unscrewed from the housing, the shaft and the anti-friction bearings are removed from the housing and the anti-friction bearings are retained as a unit on said shaft.

4. A driving axle and a wheel mounting for motor driven vehicles comprising, in combination with an axle body or housing, a rotative driving shaft mounted in and removable from said housing and provided with a spindle to receive a wheel hub, anti-friction bearings between said housing and shaft, inner and outer shoulders on said shaft between which the anti-friction bearings are confined, a ring screw-threaded on the outer end of the housing and provided with a flange to close said outer end thereof and adapted to interlock with the shaft, whereby, when the ring is unscrewed from the housing, the shaft and the anti-friction bearings are removed from the housing, and means carried by the housing to engage said ring to removably lock the same in place.

5. A driving axle and a wheel mounting for motor driven vehicles comprising, in combination with an axle body or housing, a rotative driving shaft in said housing and removable endwise therefrom, anti-friction bearings between said housing and shaft and removable with said shaft, said shaft being provided with a flange, and a ring screw-threaded to the housing provided with a flange to close the outer end thereof and to fit behind said shaft flange.

6. A driving axle and wheel mounting for motor driven vehicles comprising, in combination with an axle body or housing, a rotative driving shaft mounted in and axially removable from said housing, anti-friction bearings between said housing and shaft and removable with said shaft, said shaft being provided exterior to the housing with a flange, a ring screw-threaded to the housing and provided with a flange to close the outer end of the housing and to fit behind said shaft flange, and a dust cap carried by said ring flange and bearing on the periphery of the shaft flange.

In testimony, that I claim the foregoing as my invention I affix my signature in the presence of two witnesses, this 18th day of October, A. D. 1913.

THOMAS I. DUFFY.

Witnesses:
W. L. HALL,
G. E. DOWLE.